(12) United States Patent
Underwood

(10) Patent No.: US 8,371,403 B2
(45) Date of Patent: Feb. 12, 2013

(54) TRACKED MOBILITY DEVICE

(75) Inventor: Travis Underwood, North Vernon, IN (US)

(73) Assignee: Travis Underwood, North Vernon, IN (US)

( * ) Notice: Subject to any disclaimer, the term of this patent is extended or adjusted under 35 U.S.C. 154(b) by 176 days.

(21) Appl. No.: 12/849,897

(22) Filed: Aug. 4, 2010

(65) Prior Publication Data

US 2011/0031045 A1 Feb. 10, 2011

Related U.S. Application Data

(60) Provisional application No. 61/231,160, filed on Aug. 4, 2009.

(51) Int. Cl.
  *B62D 55/084* (2006.01)
  *B62D 55/00* (2006.01)
(52) U.S. Cl. ........ 180/9.5; 180/9.1; 180/9.52; 180/9.32; 180/6.48
(58) Field of Classification Search .................. 180/9.5, 180/9.1, 9.52, 9.32, 9.36, 6.48, 6.5, 6.54, 180/907
See application file for complete search history.

(56) References Cited

U.S. PATENT DOCUMENTS

| | | |
|---|---|---|
| 3,068,950 A | 12/1962 | Davidson |
| 3,231,036 A | 1/1966 | Appenrodt |
| 3,259,200 A | 7/1966 | Maijala |
| 3,776,326 A | 12/1973 | Davin et al. |
| 4,077,483 A | 3/1978 | Randolph |
| 4,194,584 A | 3/1980 | Kress et al. |
| 4,674,584 A | 6/1987 | Watkins |
| 4,688,813 A | 8/1987 | Misawa et al. |
| 4,747,457 A | 5/1988 | Buscaiolo et al. |
| 4,898,256 A | 2/1990 | Lehner |
| 4,915,184 A | 4/1990 | Watkins |
| 4,960,180 A | 10/1990 | Livingston |
| 5,123,495 A | 6/1992 | Littlejohn et al. |
| 5,308,098 A | 5/1994 | Shea |
| 5,363,937 A | 11/1994 | James |
| 5,413,367 A | 5/1995 | Ochiai |
| 5,577,567 A | 11/1996 | Johnson et al. |
| 5,839,802 A * | 11/1998 | Sheets ............................ 305/52 |
| 6,225,167 B1 | 5/2001 | Yu et al. |
| 6,250,409 B1 * | 6/2001 | Wells ........................... 180/9.52 |
| 6,325,167 B1 | 12/2001 | Jiang |
| 6,604,590 B2 | 8/2003 | Foulk, Jr. |
| 6,913,103 B2 | 7/2005 | Kitasaka et al. |
| 7,036,894 B1 | 5/2006 | Woodall et al. |
| 7,111,697 B2 | 9/2006 | Brazier |
| 2002/0017403 A1 | 2/2002 | Phely |
| 2003/0121705 A1 | 7/2003 | Rau |
| 2003/0183428 A1 | 10/2003 | Hedeen |
| 2003/0226697 A1 | 12/2003 | Haringer |

(Continued)

*Primary Examiner* — Tashiana Adams
*Assistant Examiner* — Jacob Knutson
(74) *Attorney, Agent, or Firm* — Woodard, Emhardt, Moriarty, McNett & Henry LLP

(57) ABSTRACT

A tracked mobility device includes: a) a pair of independent, self-supported track drives defining a planar ground contact area; b) a multi-directional wheel having a raised position above the plane of the ground contact area, and a lowered position below the plane of the ground contact area; and c) an actuator for moving the multi-directional wheel to either its raised or its lowered position. When the actuator lowers the multi-directional wheel, part of the planar ground contact area is raised from the ground without raising all of the planar ground contact area from the ground. Each track drive functions independently so that bumps along one track may be traversed without tilting the entire vehicle. Each track drive may be attached to the vehicle body with flexible mounts that allow each track drive to independently tilt upward or downward as the device moves on its tracks.

18 Claims, 13 Drawing Sheets

U.S. PATENT DOCUMENTS

2004/0216932 A1 11/2004 Giovanetti et al.
2006/0037789 A1 2/2006 Kritman et al.
2006/0127239 A1 6/2006 Adamic et al.
2007/0017713 A1 1/2007 Sewell et al.

* cited by examiner

TRACKED MOBILITY DEVICE

REFERENCES TO RELATED APPLICATIONS

This application claims the benefit of U.S. Provisional Application No. 61/231,160 filed, Aug. 4, 2009, which is hereby incorporated by reference.

FIELD OF THE INVENTION

The present invention relates generally to devices for transporting an individual, and more particularly to a personally mobility device that is powered by a track or pair of tracks.

Background

Personal mobility devices are vehicles designed to transport one person at a time, usually with room for a small amount of cargo. These devices may be operated while standing, such as with the Segway Personal Transporter, or they may be operated while sitting, such as with a common wheel chair.

Personal mobility devices with wheels may be propelled either manually (by turning the wheels by the hand) or by various automated systems. For example, electric powered wheelchairs (EPWs) use electric motors to move the wheels. They are usually powered by 4 or 5 amp deep-cycle rechargeable batteries, similar to those used to power outboard boat engines.

EPWs are typically operated using a joystick on a controller that controls the speed and direction. The wheels may be turned at variable speed in either direction, giving the chair a zero-turning-radius capability and making navigation through relatively narrow pathways possible.

However, wheels present disadvantages, particularly when the terrain is soft or uneven, as may be the case outdoors. In soft ground, the weight of the vehicle and occupant causes the wheels to sink into the ground and become difficult to turn. On uneven terrain, including curbs and stairs, the wheels may be difficult to roll over a significant change in height.

One alternative to wheeled vehicles is a tracked vehicle that uses a continuous track instead of wheels. The tracks are in contact with a larger surface area than would generally be the case with wheels, and thus exert a lower force per unit area on the ground being traversed than a conventional wheeled vehicle of the same weight. This makes them particularly suitable for use on soft, low friction and uneven ground such as mud, ice and snow.

There are disadvantages to tracked vehicles too, though. For example, the track contacts the ground with a long and wide footprint, and therefore requires and uses significant power to overcome the resistance of friction during movement. Also, tracked vehicles can cause significant damage to carpets or floors when used indoors, since the track presents a large contact area with the floor as described above. Further, the turning radius of a tracked vehicle is typically larger than the turning radius of a wheeled vehicle due to the length of the track.

A need therefore exists for a personal mobility vehicle that combines the low-friction, quick-turning, indoor and outdoor drivability of wheel chairs with the off-road capability of a tracked vehicle. The present invention addresses that need.

Summary Of The Invention

In one aspect of the present invention there is provided a tracked mobility device having a pair of independent, self-supporting track drives that may operate in conjunction with a multi-directional wheel to facilitate indoor and outdoor operation of the vehicle. In one embodiment the device comprises: a) a pair of independent, self-supporting track drives, with each track drive defining a planar ground contact area; b) a multi-directional wheel having a first, raised position above the plane of the planar ground contact areas when the device is resting on level ground, and a second, lowered position below the plane of the planar ground contact areas; and c) an actuator for moving the multi-directional wheel between its raised and lowered positions; wherein the actuator is effective to raise the multi-directional wheel to a position where it does not interfere with the movement of the device over substantially level ground, and wherein the actuator is effective to lower the multi-directional wheel an amount sufficient to raise part of the planar ground contact area of each track drive from the ground without raising all of the planar ground contact area from the ground.

In another aspect of the present invention there is provided a tracked mobility device having two, self-supported, independent track drives. The independent track drives preferably support the vehicle body with flexible mounts that allow each track drive to independently tilt upward or downward as the device moves on its tracks.

The tracked mobility device may use track drives having a flexible track, a drive wheel, and a plurality of rollers positioned between a pair of spaced-apart frame members. The plurality of rollers may include an idler roller and a set of carrier rollers.

The flexible tracks may have a "T"-shaped cross section defining a horizontal portion and a vertically-extending portion. The drive wheel and rollers may have a groove around their circumference to accept the vertically-extending portion of the track.

The controller may be effective for independently controlling the speed and direction or rotation of each drive track.

DESCRIPTION OF PREFERRED EMBODIMENTS

Figure 1:
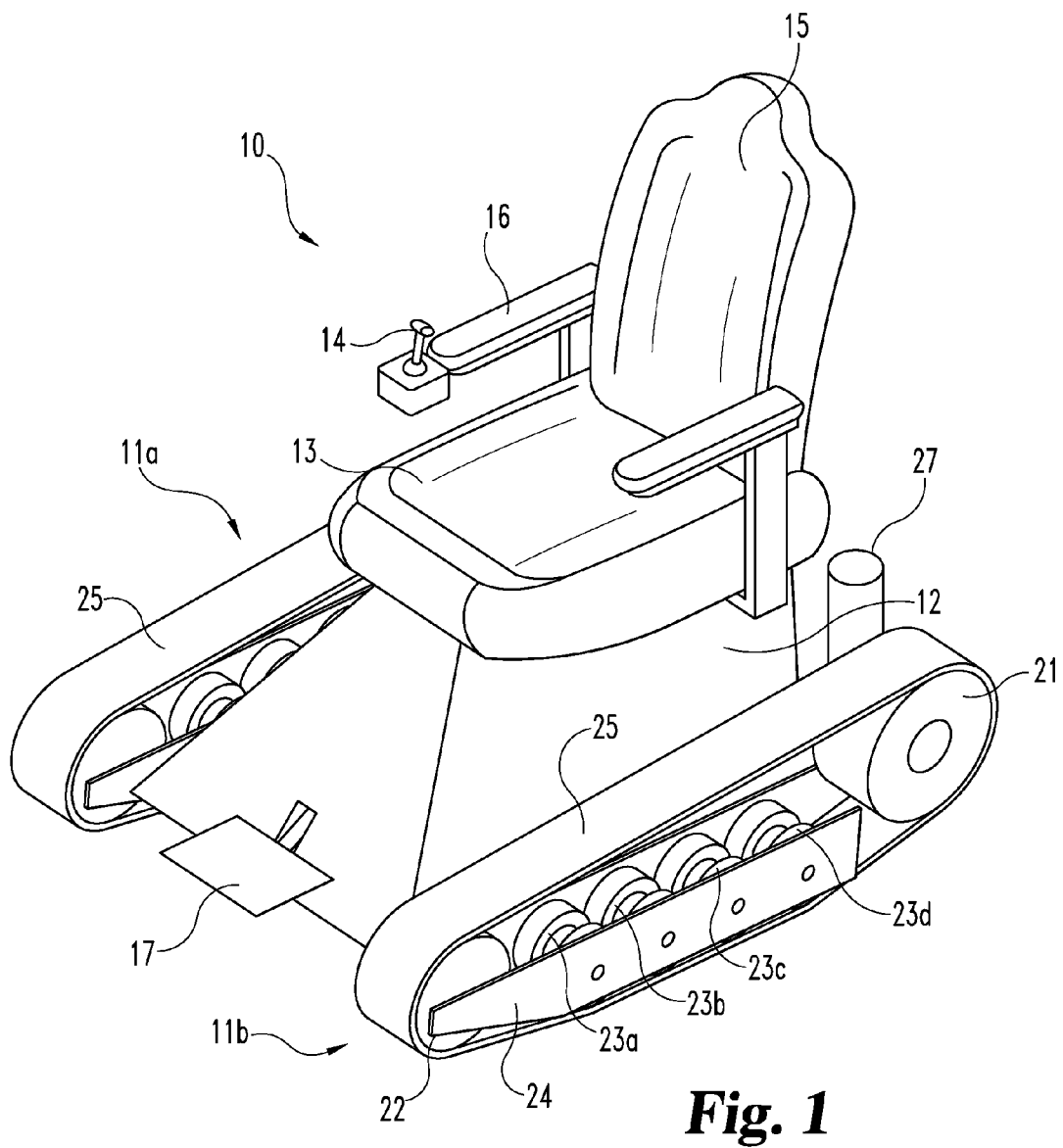
FIG. 1 is a perspective view of the tracked mobility device of the present invention according to one preferred embodiment.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

As previously indicated, one aspect of the present invention provides a tracked mobility device having a pair of self-supported, independent track drives, a body, controls, and a seat. Each of the track drives includes a flexible track, a drive wheel, and a plurality of rollers positioned between a pair of spaced-apart frame members. The body may be mounted on the pair of self-supported, independent track drives with a flexible mount that allows each track drive to flex independently with respect to the body. Thus, each track may independently tilt upward or downward as the device moves forward or rearward on its tracks.

In one preferred embodiment each of the track drives includes a drive shaft connected to a motor, a drive wheel connected to the drive shaft, a set of rollers aligned with the drive wheel, a flexible track, and a frame to hold the assembly together as a self-supported unit. The set of rollers may include an idler roller and a series of carrier rollers.

In another aspect of the present invention the tracked mobility device may additionally or alternatively comprise: a) a pair of independently-tiltable track drives defining a planar ground contact area; b) a multi-directional wheel having a first, raised position above the plane of the planar ground contact area, and a second, lowered position below the plane of the planar ground contact area; and c) an actuator for lowering said multi-directional wheel to its lowered position; wherein the actuator is effective to lower the multi-directional wheel an amount sufficient to raise part of the planar ground contact area from the ground without raising all of the planar ground contact area from the ground. When so positioned, the vehicle contacts the ground at three places: a small (forward or rearward) portion of each track drive, and the free-spinning multi-directional wheel. This allows the vehicle to move with significantly less track contacting the ground than would be the case with conventional track drive systems, improving vehicle efficiency and protecting floors from damage by the track.

1. The track drive.

In one preferred embodiment the mobility device uses a pair of independent track drives. Each track drive preferably uses a motor to turn a drive shaft, which then turns a drive wheel. Each drive wheel moves a track in the forward or rearward direction. A track drive frame may be used to hold the track drive components together as an independent, self-supported assembly. Each track drive frame may be mounted to a vehicle body with flexible mounts that allow the track drive to flex independently with respect to the body, thus allowing each track to independently tilt upward or downward as the device moves forward or rearward on its tracks.

Moreover, the track drives may be self-supporting in that they do not rely on any external frame or support such as the frame of the chair. When powered, the independent, self-supporting track drives may be used to propel an individual or device without the support of any external body.

a) The motor.

Each track drive is preferably independently powered by a separate motor. The motor may be an electric motor such as an AC- or DC-battery powered motor.

b) The drive shaft.

Each motor preferably drives one drive shaft, which preferably comprises a ¾ inch axle. The drive shaft may be driven directly by the motor, or it may be driven by a mechanical linkage. Gears to adjust the rotational speed of the drive shaft are preferably included.

c) The drive wheel.

The track drive preferably includes one drive wheel for each track drive. The drive wheels may reside at the rear or the front of each track drive, where they are easily driven by a drive shaft.

In one embodiment the drive wheels have a diameter of about 8 inches, and a width of about 3 inches. The drive wheels may include a groove to facilitate alignment of the track. In one embodiment the groove is between about 0.75 inches and about 0.80 inches wide, and is most preferably about 0.78 inches wide. The depth of the groove preferably is approximately the same as the groove width.

The drive wheels function to turn the flexible track of the track drive, thereby moving the device in either a forward or a rearward direction. Each drive wheel is capable of moving at a variable speed in either a forward or a rearward direction.

The bottom of the drive wheels of each track are preferably raised such that the track is about ¼" to 1", and more preferably about ¼" to ½", above the ground at the bottom of the drive wheel.

d) The set of rollers.

The device includes a plurality of rollers to extend the contact area for the track to contact the ground. In one embodiment the device includes an idler roller at the end of the track drive opposite the drive wheel, and a set of three, four, or five (most preferably four) carrier rollers between the drive wheel and the idler roller.

In one embodiment the idler roller has a diameter of about six inches and a width of about three inches. The idler roller may have a center groove around its circumference to facilitate alignment of the track. The center groove is sized to match the size of a corresponding groove on the drive wheel, and accordingly preferably has a width of about 0.78 inches, and a depth of about 0.75 inches. The idler roller spins on an axle that is attached to the frame of the track drive.

A set of carrier rollers is preferably provided between the idler roller and the drive wheel. The carrier rollers spin on axles that are attached to the frame of the track drive.

In one embodiment the idler roller is raised such that the track is about ¼" to 1", and more preferably about ¼" to ½", above the ground at the bottom of the idler roller. This causes the ground contact area to be below the set of carrier rollers. That ground contact area may include a forward portion beneath one of the end carrier rollers, a rearward portion beneath the other end carrier roller, and a middle portion beneath the carrier rollers that are not at an end of the set of carrier rollers.

One or more of the carrier rollers may be a "floating" roller that moves up or down in the frame according to the terrain. A floating roller may move up or down a distance of about ¼ inch in the most preferred embodiments.

In one embodiment, one or more of the rollers may actually be a pair of rollers sharing an axle. This is particularly advantageous for the idler roller, which may comprise a pair of match rollers instead of a single roller having a groove. When a pair of rollers is used the rollers may be spaced apart a distance equal to or greater than the width of a corresponding groove.

The idler roller and the carrier rollers are not powered, and turn on their axles according to the movement of the flexible track. The rollers function to extend the area that the track contacts the ground, thus providing greater stability and power to the device.

e) The flexible track.

The device includes a pair of flexible tracks—one for each track drive. Each track comprises a flexible band that moves continuously as the drive wheel rotates. The tracks may be made of any material with the flexibility and strength to drive a personal mobility vehicle over grass, gravel, concrete, wood, carpet, etc., and is preferably made of a heavy-weight rubber or synthetic material such as is used to make automobile tires. The material preferably includes fibers woven into the material, such as metal, nylon or other synthetic fibers.

Each track may have a cross section shaped as a "T" so that the track can be aligned in grooves in the drive wheel and/or the idler and/or carrier rollers. When the tracks have a "T"-shaped cross section, the track defines a horizontal portion and a vertically-extending portion. The horizontal portion may have a width that extends slightly beyond the width of the rollers, such as a four-inch-wide track for three-inch-wide rollers. The vertically-extending portion is sized to be accepted in grooves of the rollers, and is accordingly preferably about ¾ inch tall.

In one embodiment the vertical portion of the "T" has a tapered shape to facilitate alignment with the roller grooves.

In that embodiment it is preferred that the vertical end (bottom) portion of the "T" is slightly more narrow than the (upper) portion of the "T" that connects with the horizontal portion of the track. For example, the bottom end portion may be ½ inch wide when the upper portion that connects with the horizontal part of the track is ¾ inch wide.

The track may have a smooth outer surface, or it may be ridged or provided with other traction-improving features.

As indicated above and as shown in the drawings, the flexible track contacts the ground along an elongated (typically rectangular) area beneath the drive wheel and/or its associated rollers. When the drive wheel and/or some of the rollers are raised relative to other wheels and/or rollers, the ground contact area is typically directly beneath the lower wheels/rollers. In the referred embodiment wherein the track drive includes a raised drive wheel, a raised idler roller, and a set of four carrier rollers, the ground contact area is directly beneath the set of four carrier rollers.

The ground contact area may be described as including a forward portion and a rearward portion. In the most preferred embodiment the forward portion is beneath one end of the rollers, and the rearward portion is beneath the other end of the rollers. A middle portion beneath the rollers that are not at one of the ends is also present in the preferred embodiment illustrated herein.

The ground contact area of the tracks is typically coplanar, although each of the tracks may be tilted from the plane as the device moves over bumps, etc. in the vehicle's path. When the device is positioned on level ground, the ground contacting area of the tracks defines a lower track plane.

f) The track drive ground contact area.

The track drive contacts the ground with a generally planar "horizontal" ground contact area when the vehicle is placed on flat, level ground. In the most preferred embodiments the horizontal planar ground contact area is directly beneath the set of three or more (preferably four) carrier rollers since the drive wheel and the idler roller are raised somewhat from the ground. In such embodiments, the area directly beneath the front carrier roller may be described as a forward, horizontal, planar ground contact area, and the area directly beneath the rear carrier roller may be described as a rearward, horizontal, planar ground contact area. A middle, horizontal, planar ground contact area may be described as the area directly beneath the middle two carrier rollers.

In some embodiments the track drive additionally includes forward and/or rearward planar ground contact areas that tilt upward from the horizontal ground contact area. such embodiments may be referred to as having "tri-planar" ground contact areas. The forward and/or rearward upward-tilting ground contact areas typically only contact the ground when the vehicle is moving over rough terrain, such as a curb or a stair.

g) The track drive frame.

A track drive frame may be used to hold the components of each track drive together as an independent, self supported assembly. By connecting the mobility device body to the frames, the body may be supported by the two track drives. When the track drive is configured as a self-supported, independent assembly, the track drive does not require any other body for support. Most preferably, the track drive is constructed such that it may be detached from the remainder of the personal mobility device and used alone if provided with appropriate controls.

In one embodiment the frame includes a single frame member that extends from the drive wheel to the idler roller. In another embodiment a pair of spaced-apart frame members is used. Each track guide may be made of metal or another material with enough structural integrity to hold the track in proper alignment and support the body of the mobility device. Aviation-grade aluminum is used in some preferred embodiments.

The dimensions of the frame may vary according to the needs of a particular device. In one preferred embodiment the frame has a length of between about 27 inches and about 37 inches. In another embodiment the frame has an outer frame member with a length of about 27 inches, and an inner frame member with a length of about 37 inches. The spaced-apart frame members may be spaced apart by a distance appropriate for allowing the track to move freely between the frame members. For example, when a 4-inch wide track is used the frame members may be spaced apart by a distance of slightly more than four inches.

2. The body.

In one preferred embodiment the mobility device includes a body that is supported by and between the pair of track drives. The body may be made of metal, plastic, composite, or some other material appropriate for covering the elements that are housed in the body. In the most preferred embodiments the body is a light weight plastic or other composite material.

The dimensions of the body may vary according to the desired size of the device, but in one preferred embodiment the body has a length of about 22 inches to 24 inches, a width of about 16 inches to 18 inches, and a height of about 11 inches.

Although a body frame is not necessary with some embodiments of the present invention, the body may comprise a frame, or it may be mounted on a frame if desired. When included, the frame is preferably not used to support the track drives; instead, the track drives may be connected to and support the frame. The frame may also support other elements of the device such as a seat.

In one embodiment the body comprises a body frame and a body housing to cover internal components and support a seat.

The body may be mounted to the track drives with mounting brackets that allows each track drive to pivot slightly with respect to the body. This enables a seat mounted on the body to remain relatively level and stable when small bumps and inclines are encountered by a track. The mounting bracket may include one or more flexible bushings for receiving and holding a bracket member in a manner that allows the bracket member to flex within the bushing.

In one embodiment the mounting bracket includes a pair of flexible bushings—one at each end of a bracket member. The flexible bushings allow the bracket member to twist or move up to 15° in the bushing.

3. The seat.

The tracked mobility device may include a seat. The seat may be a bench seat, or it may have a back. Arms may be included if desired, and may be sized to accommodate controls that are easily accessible by the user's hand(s).

4. The Controls.

The device may include controls to control the direction and speed at which each track moves. The device may also include controls to control the actuator(s) which lower the multi-directional wheel(s). The controls may be operated by a joystick which moves forward to move both tracks forward, or moves backward to move both tracks backward, or moves to the left to move the right track forward and the left track backward, or moves to the right to move the left track forward and the right track backward, or any combination of speed and direction for each track. Joystick controls which control the speed and direction of rotation of each drive shaft, and thus of each track, are known to the art. Alternatively, other controls effective to control the speed and/or direction of rotation of each track may be incorporated into the device. Additionally, readouts such as LED readouts to indicate operating conditions such as battery life may be included.

5. The multi-directional wheel(s) and actuator.

In one embodiment the mobility device includes a multi-directional wheel, such as a castor wheel, and an actuator effective to lower the multi-directional wheel to a position that would be below the plane defined by bottom of the track drives when they rest on a level surface (hereinafter referred to as the track plane). When the multi-directional wheel is so lowered, one end of the device is raised and the track plane is tilted as one end of each track drive is lifted from the floor. The other end of each track drive remains on the floor, and the multi-directional wheel functions as the third contact point of a "tripod" orientation.

In the "tripod" orientation the vehicle contacts the plane of the ground/floor only with the multi-directional wheel and the track below one end portion of each track drive. This "tripod" orientation allows the device to move while reducing the area of contact between the tracks and the ground/floor.

One or more actuators may be used to raise the device to its "tripod" orientation. The actuator may use a piston or screw drive or other device to lower the multi-directional wheel and thereby raise one end of the device. The actuator may be powered by a small motor such as an electric motor.

It is to be appreciated that either the front end or the rear end of the device may be raised from the floor, according to the location of the multi-directional wheel. Accordingly, if the multi-directional wheel is located at the front of the device, the front end will be raised as the wheel is lowered to its position below the track plane. In this position the contact points are the rearward portions of the track drives, and the multi-directional wheel at the front of the device.

Similarly, if the multi-directional wheel is located at the rear of the device, the rear end will be raised as the wheel is lowered to its position below the track plane. In this position the contact points are the forward portions of the track drives, and the multi-directional wheel at the rear of the device.

It is also to be appreciated that the multi-directional wheel may be any wheel that can move in substantially any direction on a plane. As previously indicated, a castor wheel that pivots on a fork is one such wheel, but so are omni-directional or spherical wheels. A standard wheel that may only spin on an axle and which moves only forward or backward (but may not pivot or move in an arc or to one side) is not a multi-directional wheel as defined herein. All multi-directional wheels may be used in the present invention, and they may be referred to as castor wheels for the purposes of this specification even though other omni-directional wheels are intended to be included.

In one embodiment the multi-directional wheel has a first, raised position and a second, lowered position, with the actuator raising and lowering the device between its two positions. Most preferably, when the actuator lowers the wheel to its lowered position, the wheel is lowered an amount sufficient to raise the drive wheels of the track drives from the floor. When the actuator raises the multi-directional wheel to its raised position, the wheel does not contact the floor and gravity causes the entire track plane to contact the floor.

In another embodiment the device includes a pair of multi-directional wheels and a pair of corresponding actuators to lower the wheels and raise the device. In this embodiment the device may not literally assume a "tripod" orientation, but it functions similarly to a tripod embodiment in that one end of the track drives is lifted from the floor so that the device contacts the floor only at the other end of each track and at the multi-directional wheels.

It is to be appreciated that when two or more multi-directional wheels are used, the wheels may cooperate together to raise one end of the device. Accordingly, the device may be constructed such that one multi-directional wheel is effective to raise one end of the device alone (even if other multi-directional wheels are present), or the device may be constructed such that two or more multi-directional wheels are needed to raise one end of the device.

It is also to be appreciated that the multi-directional wheels stabilize the device when lowered by the actuator. This is particularly true when more than one multi-directional wheel is lowered.

Referring now to the drawings, FIG. 1 shows the tracked mobility device of the present invention according to one preferred embodiment. Tracked mobility device 10 includes track drive units 11a and 11b, body 12, seat 13, and controller 14. A seat back 15, an arm rest 16, and a foot rest 17 are optionally included.

Track drive units 11a and 11b each include a drive wheel 21, an idler roller 22, a set of carrier rollers 23 (with four carrier rollers 23a, 23b, 23c, and 23d being illustrated), a frame 24, and a flexible track 25.

In the embodiment illustrated in FIG. 1, each of the pair of independent track drives has a tri-planar ground contact area. In the illustrated embodiment each of the tri-planar ground contact areas includes a forward, tilted, planar contact area, a rearward, tilted, planar contact area, and a middle, horizontal, planar contact area. The multi-directional wheel has a first, raised position above the plane of the middle, horizontal planar contact areas when the device is resting on flat, level ground, and a second, lowered position below (lower than) the plane of said middle, horizontal, planar contact areas. The actuator lowers the wheel an amount sufficient to raise at least part of one or more of the middle, horizontal, planar contact areas from the ground without raising all of the raised middle, horizontal, planar contact areas from the ground.

Figure 2:
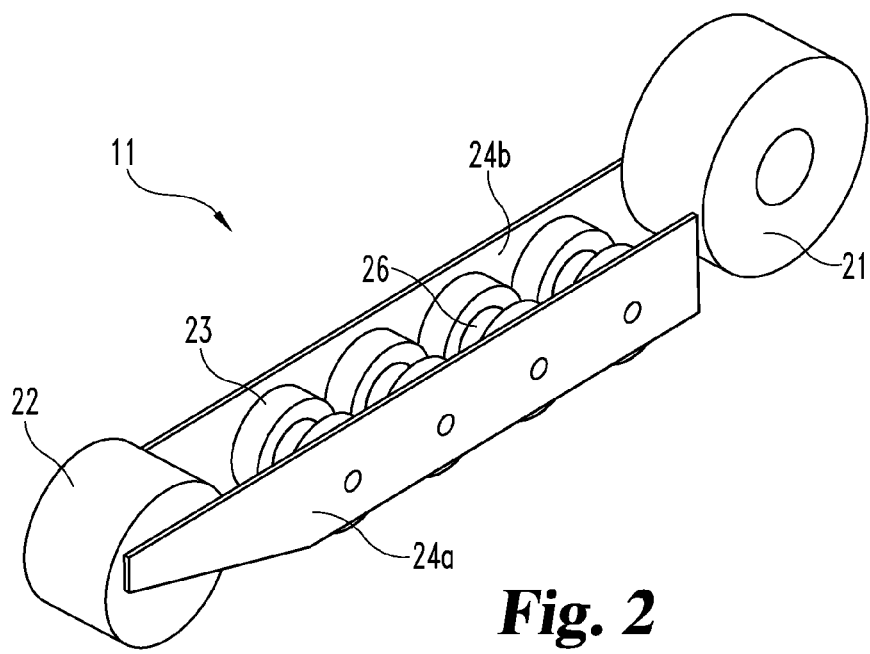
FIG. 2 is a perspective view of one embodiment of a drive track for the tracked mobility device of the present invention, without the flexible track.

FIG. 2 is a perspective view of part of a drive track for the tracked mobility device of the present invention according to one preferred embodiment. Drive track 11 includes a drive wheel 21, an idler roller 22, a set of carrier rollers 23, and a pair of spaced-apart frame members 24a and 24b. Carrier rollers 23 are illustrated to include a groove 26 to assist in maintaining alignment of track 25. Drive track 11 is self-supporting and capable of moving independently of any structure to which is may potentially be attached.

Figure 3:
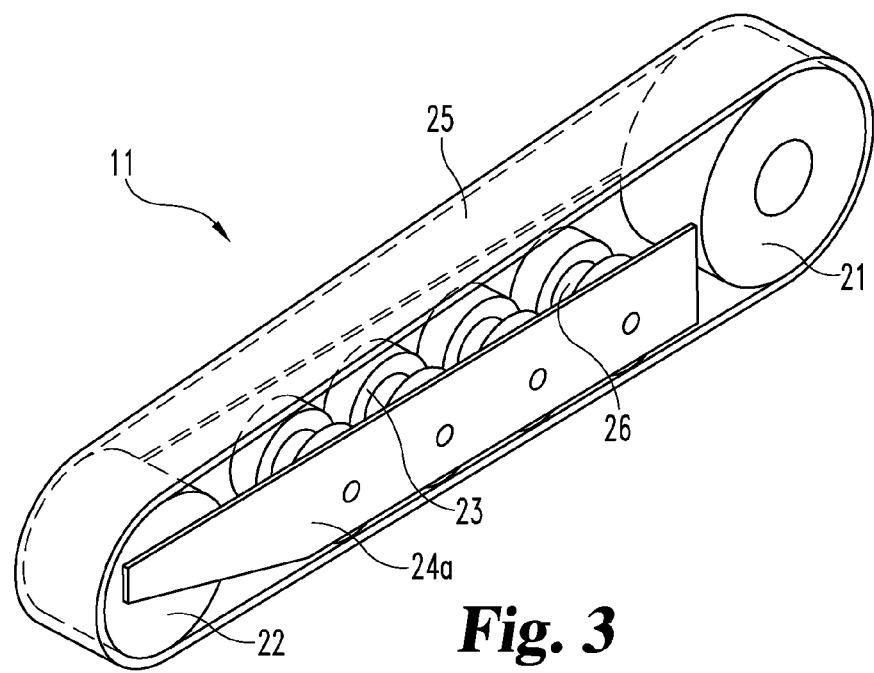
FIG. 3 is a perspective view of one embodiment of a drive track for the tracked mobility device of the present invention, with the flexible track.

FIG. 3 is a perspective view of the drive track of FIG. 2, including flexible track 25. Flexible track 25 is powered by the rotation of drive wheel 21, and rolls on idler roller 22 and carrier rollers 23 as shown.

Figure 4:
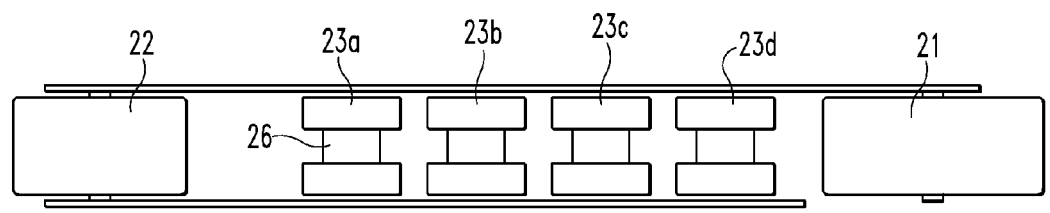
FIG. 4 is a top plan view of one embodiment of a drive track for the tracked mobility device of the present invention, without the flexible track.

FIG. 4 is a top plan view of part of a drive track for the tracked mobility device of the present invention according to one preferred embodiment. As with FIGS. 2 and 3, illustrated track drive unit 11 includes a drive wheel 21, an idler roller 22, a set of carrier rollers 23 (with four carrier rollers 23a, 23b, 23c, and 23d being illustrated), and a frame 24.

Figure 5:
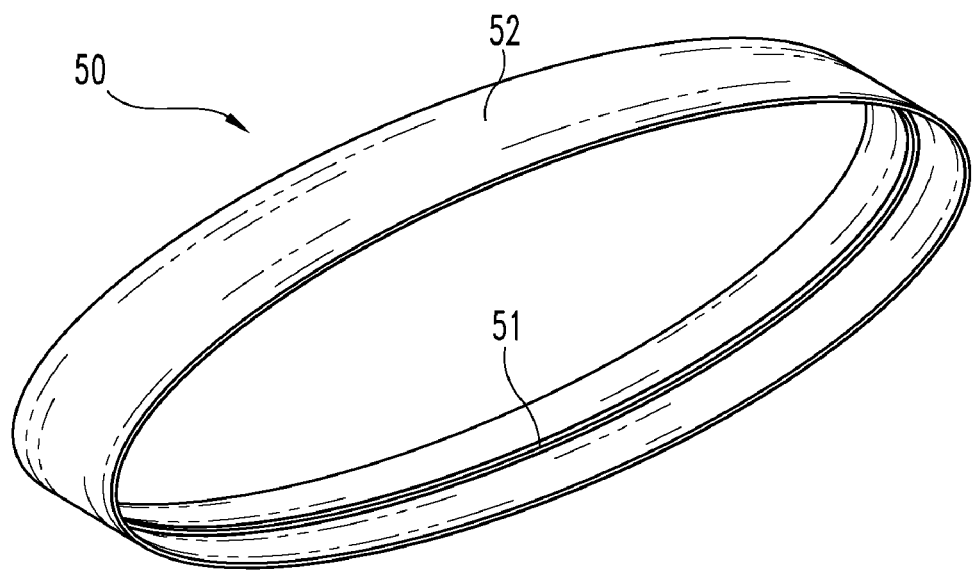
FIG. 5 is a perspective view of a flexible track for use in one embodiment of a drive track for the tracked mobility device of the present invention.

FIG. 5 is a perspective view of one embodiment of the flexible track of the present invention. Flexible track 50 includes an outer surface 52 and an inner rib 51 sized to fit in the grooves of the track rollers.

Figure 6:
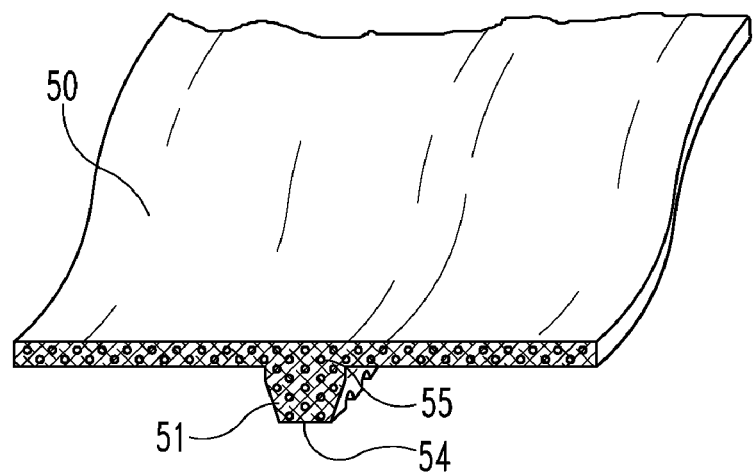
FIG. 6 is a partial section view of a flexible track for use in one embodiment of a drive track for the tracked mobility device of the present invention.

FIG. 6 is a section view of the flexible track of FIG. 5. Flexible track rib 51 may have a width at its bottom end 54 of about ½ inch, and a width at its top end 55 of about ¾ inch.

Figure 7:
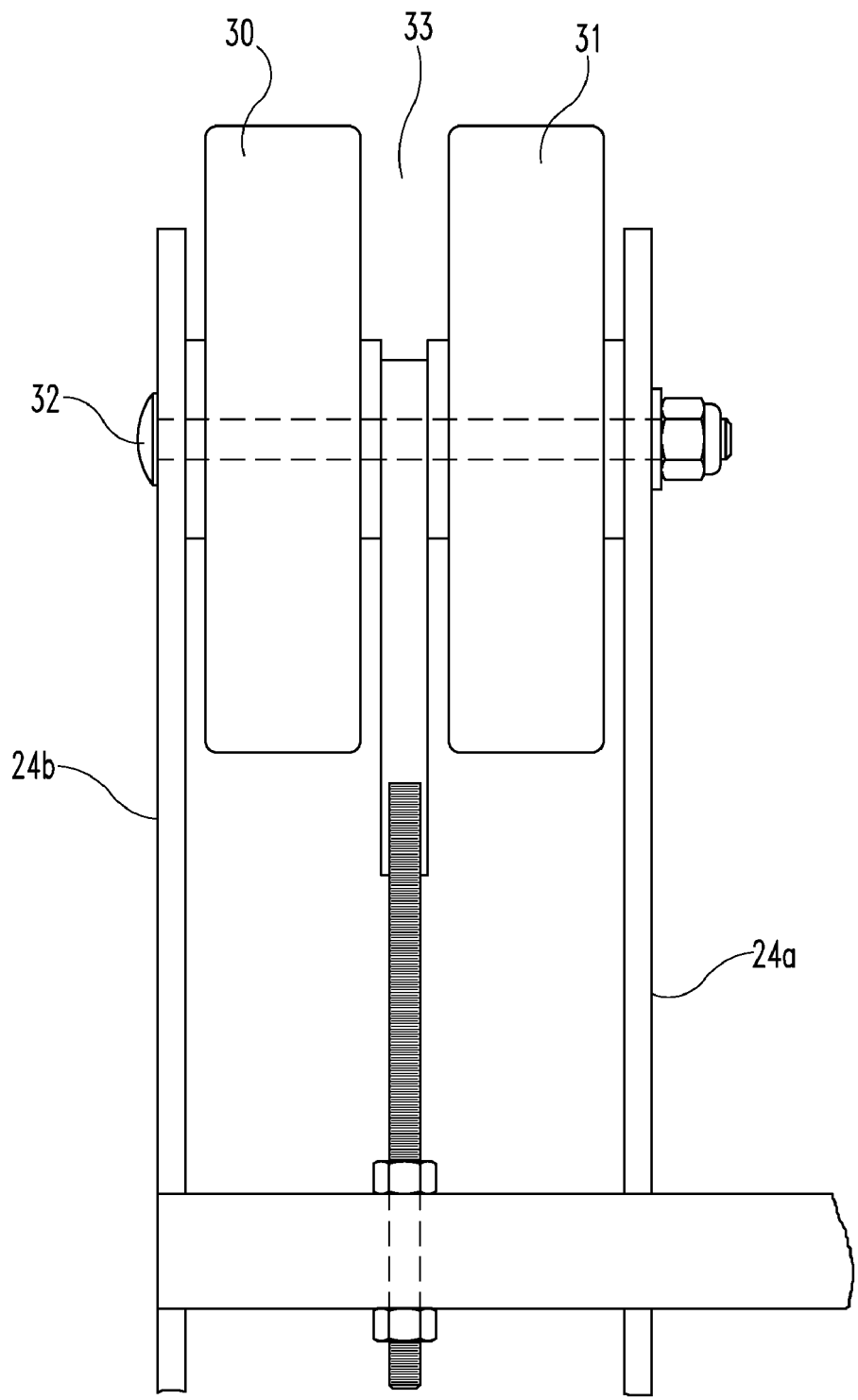
FIG. 7 is a top plan view of part of a drive track for the tracked mobility device of the present invention according to a second preferred embodiment.

FIG. 7 is a top plan view of part of a drive track for the tracked mobility device of the present invention according to a second preferred embodiment. In this embodiment a two-part, or split, idler wheel is shown, with the idler wheel including first idler wheel 30 and second idler wheel 31, both of which are mounted on axle 32 and are spaced apart by a gap 33.

Figure 8:
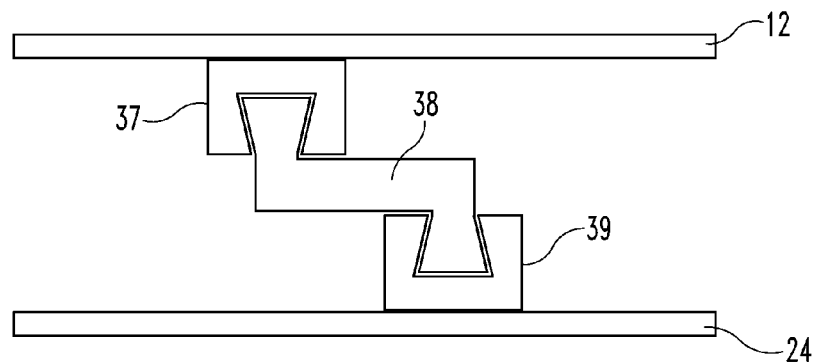
FIG. 8 is a top plan view of mounting assembly for mounting the body of the tracked mobility device to a drive track, according to one preferred embodiment of the present invention.

FIG. 8 is a top plan view, in partial section, of a mounting assembly for mounting the body of the tracked mobility device to a drive track, according to one preferred embodiment of the present invention. This mounting assembly includes a body mounting bushing 37 and a frame mounting bushing 39 holding a bracket 38. Bracket 38 is mounted in bushings 37 and 39 so as to allow flexibility of the bracket within the bushings. This allows the track drive to move up and/or down, or to twist or incline at one end, as the track advances over uneven terrain.

Figure 9A:
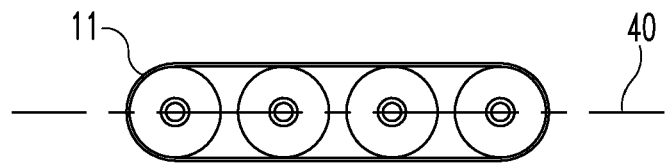
FIGS. 9A-9C illustrates the tilting of a track drive when connected to the vehicle body with a flexible mounting system.
Figure 9B:
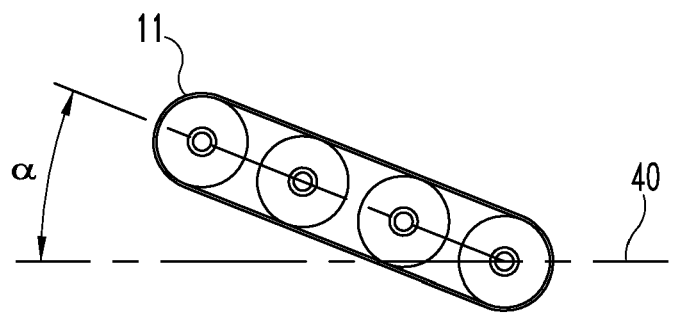
Figure 9C:
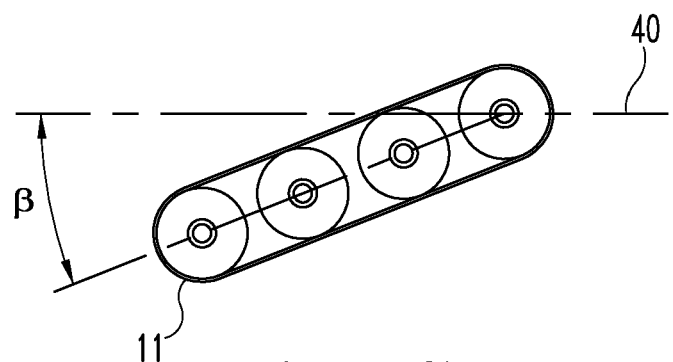

FIG. 9 illustrates how the track drives may tilt upward or downward independently. In FIG. 9A, track drive 40 is even with a horizontal line 40 along or below a vehicle body. In FIG. 9B, track drive 40 is tilted upward at an angle of $\alpha$ degrees with respect to horizontal line 40 along or below the vehicle body. In FIG. 9C, track drive 40 is tilted downward at an angle of $\beta$ degrees with respect to horizontal line 40 along or below the vehicle body.

Figure 10:
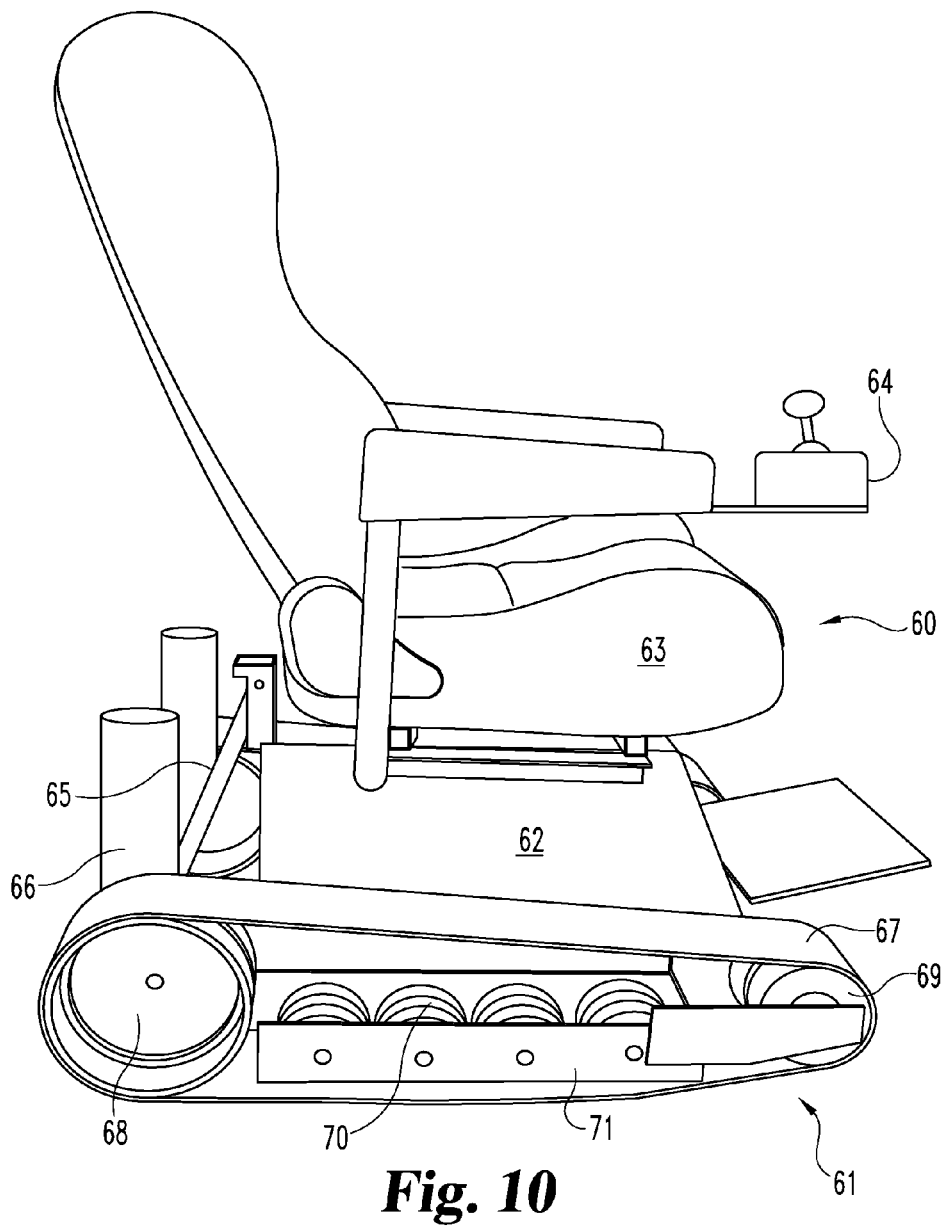
FIG. 10 is a perspective view of the tracked mobility device of the present invention according to another preferred embodiment, showing the multi-directional wheel and associated actuator.

FIG. 10 is a perspective view of the tracked mobility device of the present invention according to another preferred embodiment. Tracked mobility device 60 includes track drive units 61, body 62, seat 63, and controller 64. A seat back, arm rests, and a foot rest are also included in the illustrated device.

Tracked mobility device 60 also includes a multi-directional wheel actuator 65, a pair of motors 66, flexible track 67, drive wheels 68, idler rollers 69, and carrier rollers 70. A frame 71 holds the track drive together as a self-supported, independent assembly.

The track drive units 61 each include a bi-planar ground contact area, as shown in the drawing. Each of said bi-planar ground contact areas includes a tilted planar contact area (shown at the front of the illustrated track drive) and a horizontal planar contact area (beneath and behind frame 71). As with other embodiments, the multi-directional wheel has a first, raised position above the plane of the horizontal planar contact areas when the horizontal contact areas are on level ground (as illustrated), and a second, lowered position lower than the plane of said horizontal, planar contact areas. The actuator lowers a multi-directional wheel an amount sufficient to raise at least part of one or both of the horizontal planar contact areas from the ground without raising all of the raised horizontal planar contact areas from the ground.

Figure 11:
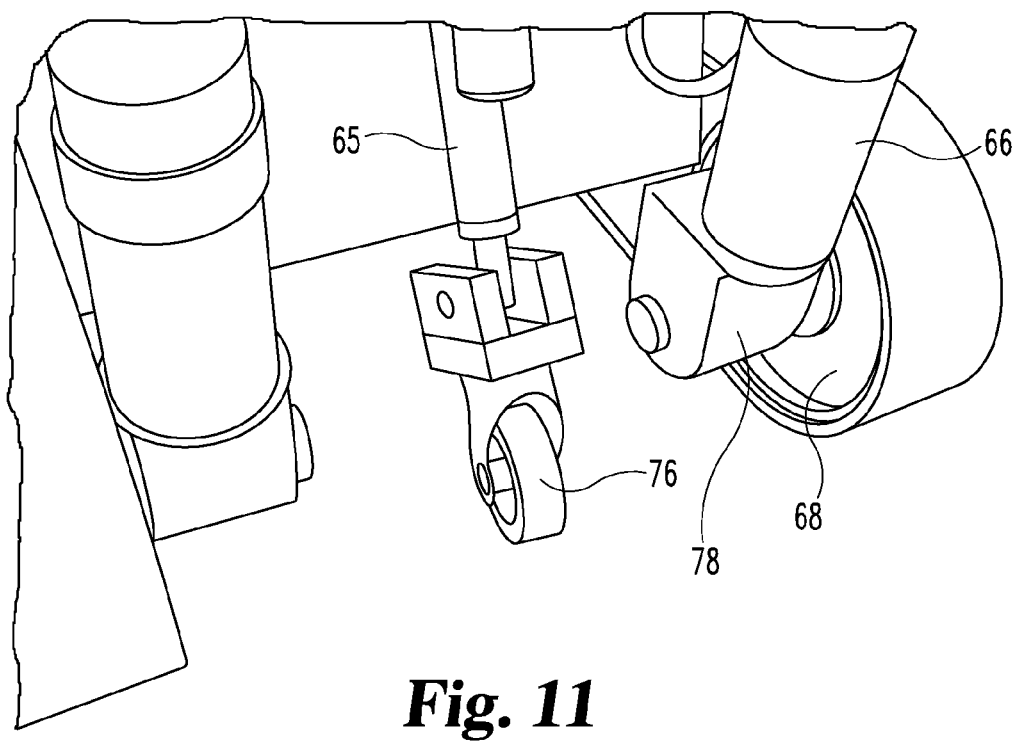
FIG. 11 is another perspective view of the tracked mobility device of FIG. 10.

FIG. 11 is a perspective view of another portion of the tracked mobility device of the present invention according to the embodiment of FIG. 10. Actuator 65 is positioned to move multi-directional wheel 76 up or down. As previously noted, the multi-directional wheel has a first, raised position above the plane of the horizontal planar contact areas of the drive tracks when the horizontal contact areas are on level ground, and a second, lowered position lower than the plane of said horizontal, planar contact areas. With this configuration the actuator may lower the multi-directional wheel an amount sufficient to raise at least part of one or both of the horizontal planar contact areas from the ground, or the actuator may raise the multi-directional wheel an amount sufficient to avoid any contact of the wheel with the ground. Gear box 78 facilitates controlling the rotational speed of drive wheel 68 when powered by motor 66.

Figure 12:
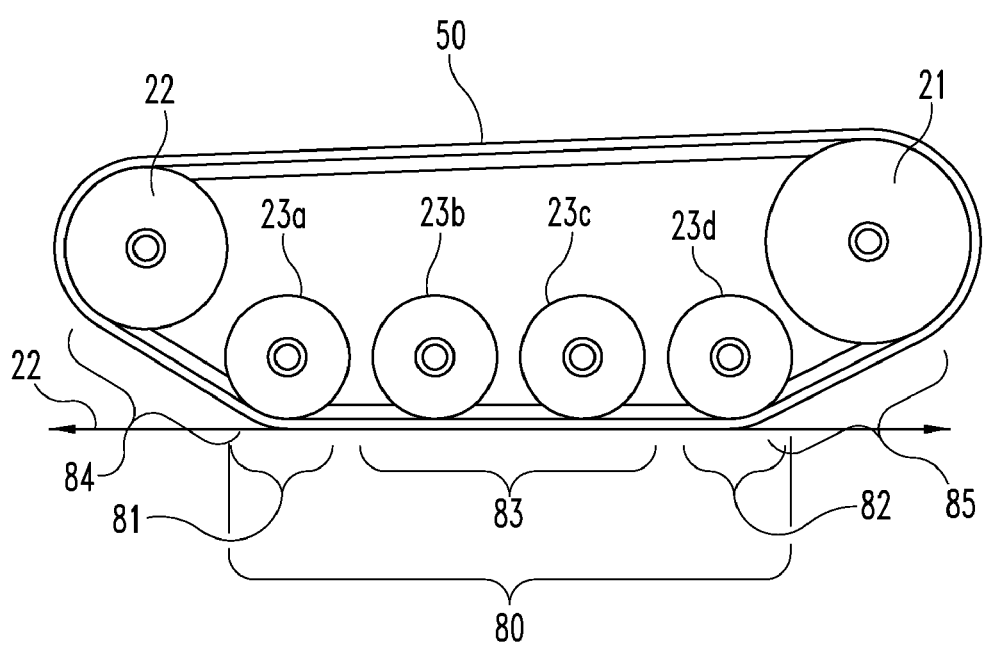
FIG. 12 illustrates the contact areas of a track drive of the present invention.

FIG. 12 illustrates one tri-planar embodiment of the track drive of the present invention. Flexible track 50 runs on drive wheel 21, idler roller 22, and carrier rollers 23a, 23b, 23c, and 23d. A horizontal, planar ground contact area 80 is defined by the area beneath the carrier rollers where the track contacts the ground when the vehicle is at rest on flat, level ground as illustrated. A forward, horizontal, planar ground contact area 81 is defined by the portion of horizontal, planar ground contact area below the front carrier roller. A rearward, horizontal, planar ground contact area 82 is defined by the portion of horizontal, planar ground contact area below the rear carrier roller. A middle, horizontal, planar ground contact area 83 is defined by the portion of horizontal, planar ground contact area below the middle two carrier rollers.

The horizontal, planar ground contact area 80 provides the middle section of the tri-planar ground contact area. A forward, tilted, planar contact area 84 is defined by the planar track contact area between idler roller 22 and front carrier roller 23a. A rearward, tilted, planar contact area 85 is defined by the planar track contact area between drive roller 21 and rear carrier roller 23d. Horizontal, planar ground contact area 80, forward, tilted, planar contact area 84, and rearward, tilted, planar contact area 85 accordingly comprise the three planar contact areas of the tri-planar embodiment of the tracked mobility device.

Figure 13:
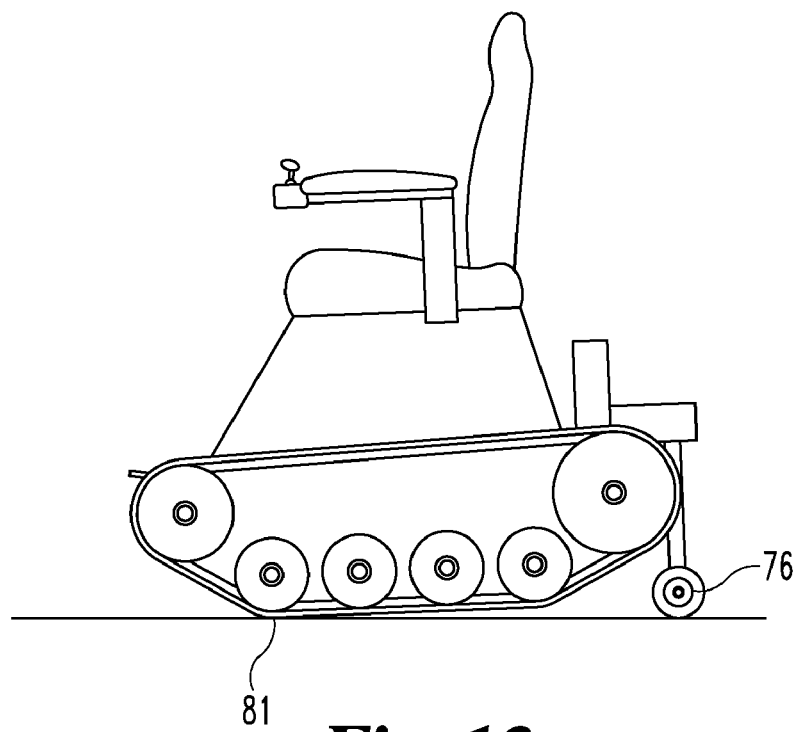
FIG. 13 illustrates one embodiment of the tracked mobility device of the present invention with the multi-directional wheel fully lowered and the opposite end of the device raised from the ground.

FIG. 13 illustrates using a rear multi-directional wheel to lift the mobility device to a "tripod" orientation. Multi-directional wheel 76 is lowered an amount sufficient to raise the rear of planar ground contact area 80 from the ground, leaving only forward ground contact area 81 in contact with the ground. When so lowered, the multi-directional wheel is positioned below the plane that is defined by the horizontal track contact area when the device is resting on level ground. When the multi-directional wheel is lowered, the plane that was formerly horizontal is tilted upwards as at least part of the horizontal track contact area is raised.

Figure 14:
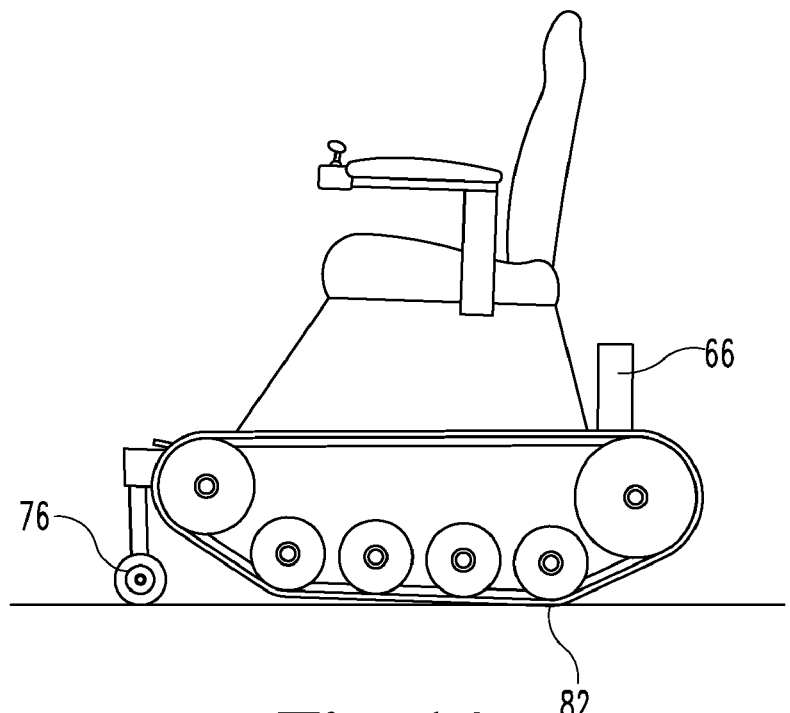
FIG. 14 illustrates one embodiment of the tracked mobility device of the present invention with the multi-directional wheel fully lowered and the opposite end of the device raised from the ground.

Similarly, FIG. 14 illustrates using a front multi-directional wheel to lift the mobility device to a "tripod" orientation. Multi-directional wheel 76 is lowered an amount sufficient to raise the front of planar ground contact area 80 from the ground, leaving only rearward ground contact area 82 in contact with the ground.

Figure 15:
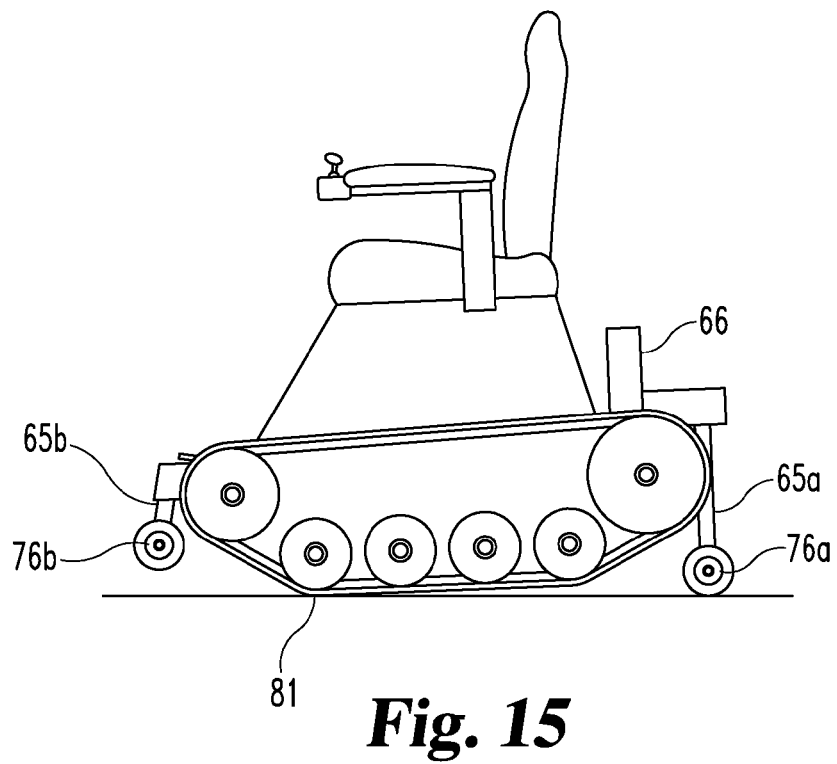
FIG. 15 is a perspective view of the tracked mobility device of the present invention according to another preferred embodiment, showing a pair of multi-directional wheels and associated actuators.
Figure 16:
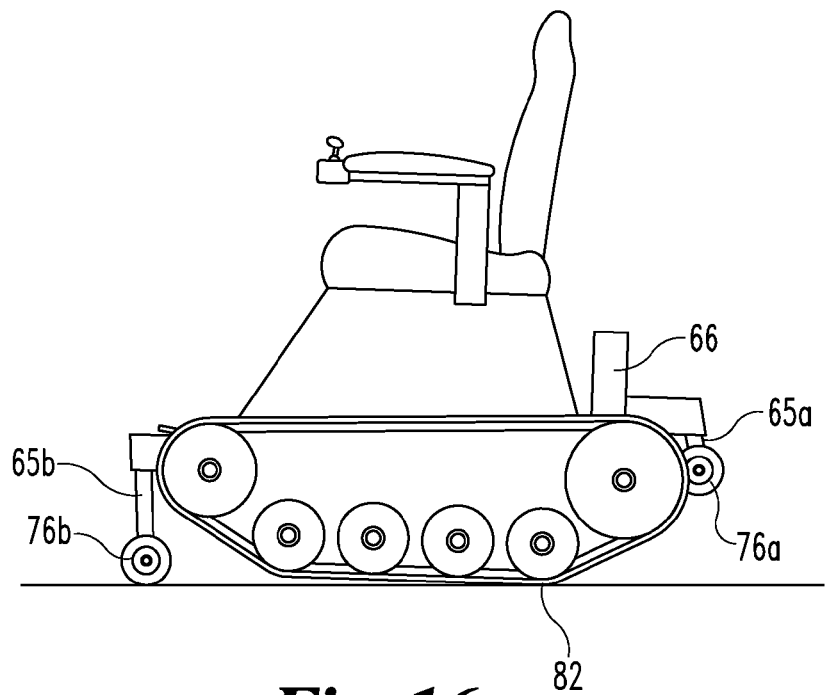
FIG. 16 illustrates the embodiment of FIG. 15 with the pair of multi-directional wheels fully lowered and the opposite end of the device raised from the ground.

FIGS. 15 and 16 illustrate embodiment similar to FIGS. 13 and 14, but with the vehicle including a pair of multi-directional wheels. In this illustrated embodiment there is a multi-directional wheel at the vehicle front, and another multi-directional wheel at the vehicle rear.

Figure 17:
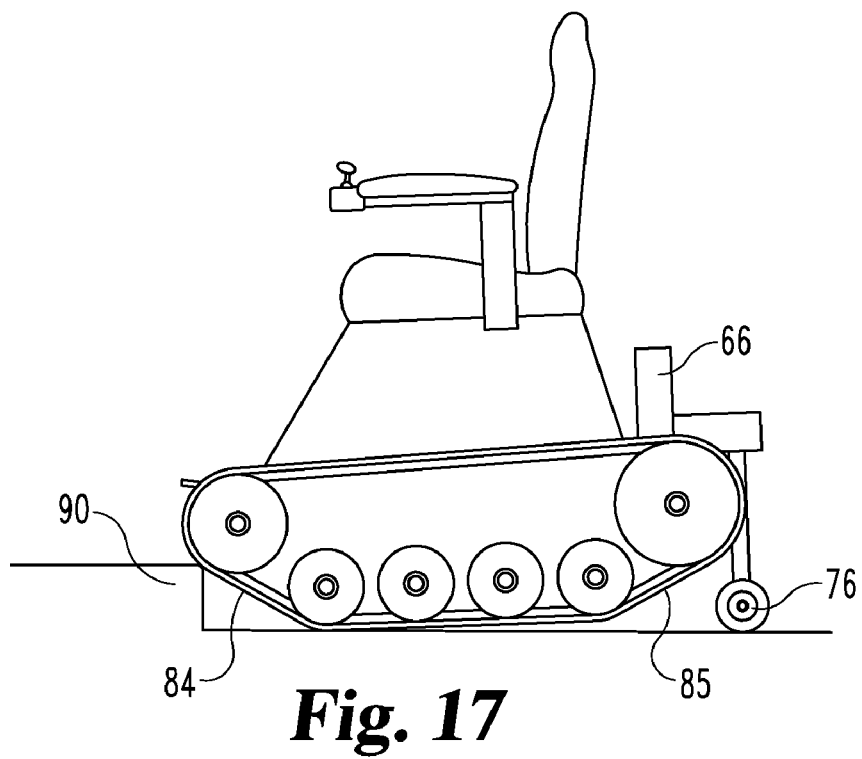
FIG. 17 is a side view of the tracked mobility device of the present invention according to another preferred embodiment, showing the device approaching a curb with the multi-directional wheel fully lowered.
Figure 18:
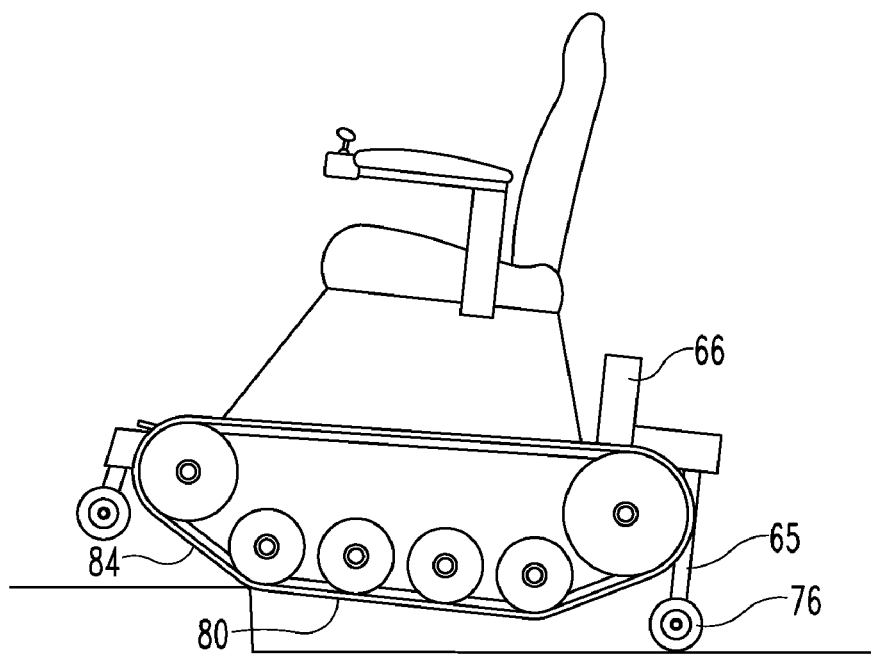
FIG. 18 is a side view of the tracked mobility device of FIG. 17, showing the device advancing over a curb with the multi-directional wheel fully lowered.

FIGS. 17 and 18 illustrate using the tri-planar embodiment to facilitate advancing over a curb. In this embodiment, forward, tilted, planar contact area 84 advances to curb 90 and the height of planar contact area 84 allows the vehicle to easily climb up the curb. Multi-directional wheel 76 may be lowered to raise the rear of the vehicle higher, thus further facilitating movement by keeping the vehicle more level than it would be if the wheel were not lowered.

Figure 19:
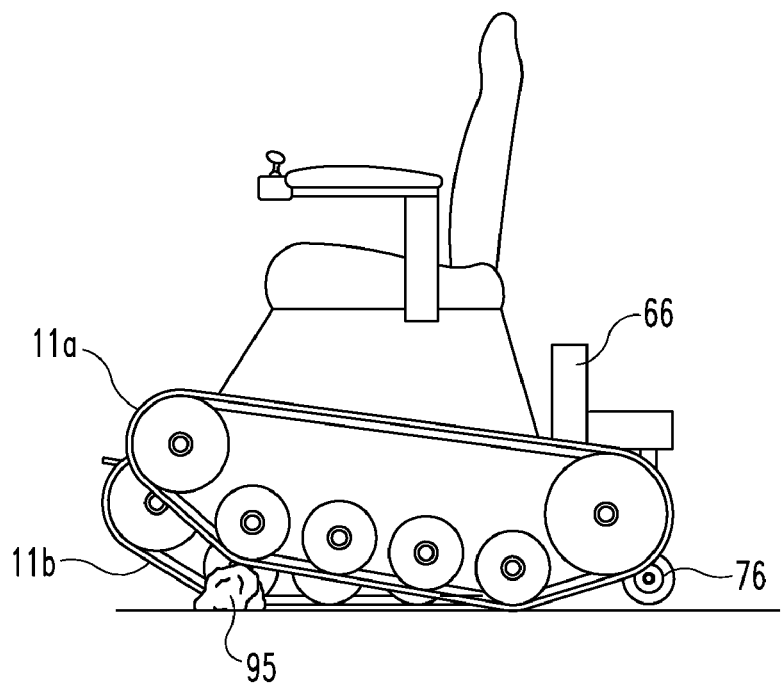
FIG. 19 is a perspective view of the tracked mobility device of the present invention showing the device advancing over uneven terrain with the track drives independently engaging the ground at different angles.

FIG. 19 illustrates how the independent track drives allow the vehicle to traverse uneven terrain without tilting or even necessarily tilting the entire vehicle. When an encumbrance, such as rock 95, is encountered, track drive 11a tilts upward independently of track drive 11b, which may remain level. Within the zone of flex of the track connection, the frame and/or seat of the device may remain level as the independent track drive tilts upward.

Figure 20:
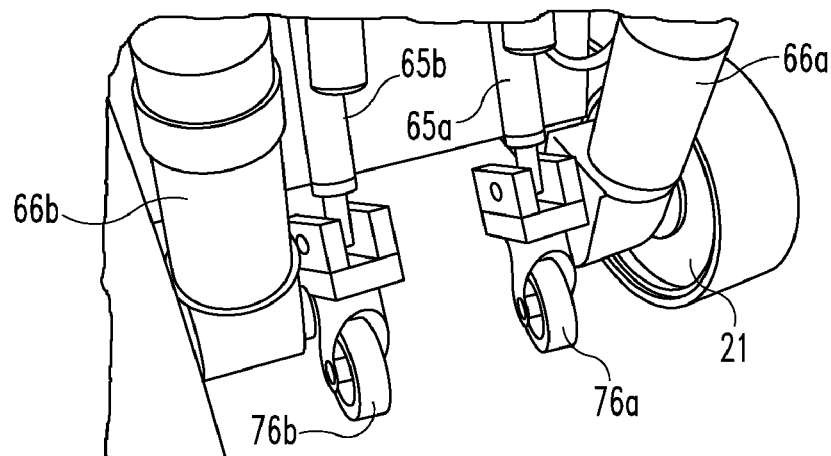
FIG. 20 is a perspective view of an embodiment in which two multi-directional wheels are included at one end, in this case at the rear of the vehicle.

FIG. 20 illustrates an embodiment in which two multi-directional wheels are included at one end, preferably the rear, of the vehicle.

While the invention has been illustrated and described in detail in the drawings and foregoing description, the same is to be considered as illustrative and not restrictive in character, it being understood that only the preferred embodiments have been shown and described, and that all changes and modifications that come within the spirit of the invention are desired to be protected.

The invention claimed is:

1. A tracked mobility device, comprising:
    a) a pair of independent, self-supported track drives having a ground contact area;
    wherein each of said independent, self-supported track drives comprises:
        i) a drive wheel;
        ii) a plurality of rollers; and
        iii) a flexible track; and
        iv) a frame; wherein said frame holds said drive wheel, said plurality of rollers, and said flexible track in an aligned orientation wherein the track drive may function as an independent, self-supported assembly;
    b) a body connected to said pair of independent track drives in a manner that allows each track drive to independently tilt upward or downward with respect to the body as the device moves forward or rearward on its tracks;
    c) a seat supported by said body;
    d) a controller to control the speed and direction of rotation of each of the track drives;
    e) a multi-directional wheel having a first, raised position above the plane of said planar ground contact area, and a second, lowered position below the plane of said planar ground contact area; and
    f) an actuator effective to lower said multi-directional wheel to its lowered position, wherein the actuator lowers said wheel an amount sufficient to raise at least part of said track drive ground contact areas from the ground when the device is resting on the ground without raising all of said track drive ground contact areas from the ground.

2. The tracked mobility device of claim 1 wherein the controller comprises a joystick effective for independently controlling the speed and direction or rotation of each drive wheel.

3. The tracked mobility device of claim 1 wherein said plurality of track drive rollers comprises an idler roller and a set of carrier rollers.

4. The tracked mobility device of claim 1 wherein at least one of said set of carrier rollers is mounted in its frame in a fixed position, and at least one of said set of carrier rollers is mounted in its frame in a floating manner that allows the roller to move upward and downward a distance of at least about ¼ inch.

5. The tracked mobility device of claim 1 wherein said first track has a "T"-shaped cross section defining a horizontal portion and a vertically-extending portion, and wherein one or more of said first plurality of rollers and one or more of said second plurality of rollers comprises a roller having a groove around its circumference to accept the vertically-extending portion of the track.

6. The tracked mobility device of claim 1 wherein the body is connected to and jointly supported by the first self-supported, independent track drive and the second self-supported, independent track drive by brackets mounted in flexible bushings that allow movement of the brackets in the bushings.

7. The tracked mobility device of claim 1 wherein the first self-supported, independent track drive and the second self-supported, independent track drive each include four carrier rollers.

8. The tracked mobility device of claim 1 wherein each of said pair of independent track drives has a ground contact area comprising a tri-planar ground contact area; wherein each of said tri-planar ground contact areas includes a forward, tilted, planar contact area, a rearward, tilted, planar contact area, and a middle, horizontal, planar contact area; wherein said multi-directional wheel has a first, raised position above the plane of said middle, horizontal planar contact areas, and a second, lowered position below the plane of said middle, horizontal, planar contact areas; and where said actuator lowers said wheel an amount sufficient to raise at least part of said middle, horizontal, planar contact areas from the ground without raising all of said middle, horizontal, planar contact areas from the ground.

9. The tracked mobility device of claim 1 wherein each of said pair of independent track drives has a ground contact area comprising a bi-planar ground contact area; wherein each of said bi-planar ground contact areas includes a tilted planar contact area and a horizontal planar contact area; wherein said multi-directional wheel has a first, raised position above the plane of said horizontal planar contact areas when the horizontal contact areas are on level ground, and a second, lowered position lower than the plane of said horizontal, planar contact areas; and wherein said actuator lowers said wheel an amount sufficient to raise at least part of said horizontal planar contact areas from the ground without raising all of said horizontal planar contact areas from the ground.

10. A tracked mobility device, comprising:
 a) a first self-supported, independent track drive comprising:
  i) a first motor operably connected to a first drive shaft;
  ii) a first drive wheel connected to the first drive shaft;
  iii) a first plurality of rollers aligned with said first drive wheel;
  iv) a first track; and
  v) a first pair of spaced-apart frame members effective for holding the first plurality of rollers in an aligned orientation; wherein said frame members additionally assist in holding the first track drive together as a self-supported, independent assembly;
 b) a second self-supported, independent track drive comprising:
  i) a second motor operably connected to a second drive shaft;
  ii) a second drive wheel connected to the second drive shaft;
  iii) a second plurality of rollers aligned with said second drive wheel;
  iv) a second track; and
  v) a second pair of spaced-apart frame members effective for holding the second plurality of rollers in an aligned orientation; wherein said frame members additionally assist in holding the second track drive together as a self-supported, independent assembly;
 c) a body jointly supported by said first self-supported, independent track drive, and by said second self-supported, independent track drive in a manner that allows each track drive to independently tilt upward or downward with respect to the body as the device moves forward or rearward on its tracks;
 d) a seat supported by said body; and
 e) a controller to control the speed and direction of rotation of each of the track drives.

11. The tracked mobility device of claim 10 wherein said set of carrier rollers includes four carrier rollers.

12. A tracked mobility device according to claim 10, and further comprising:
 f) a multi-directional wheel having a first, raised position above the plane defined by said planar ground contact area, and a second, lowered position below the plane defined by said planar ground contact area; and
 g) an actuator effective to lower said multi-directional wheel to its lowered position, wherein the actuator lowers said wheel an amount sufficient to raise at least part of said first and second track drives from the ground when the device is resting on the ground without raising all of said first and second track drives from the ground.

13. A tracked mobility device according to claim 10 wherein said first, independent track drive has a tri-planar ground contact area; wherein said tri-planar ground contact area includes a forward, tilted, planar contact area, a rearward, tilted, planar contact area, and a middle, horizontal, planar contact area; and wherein said second, independent track drive has a tri-planar ground contact area; wherein said tri-planar ground contact area includes a forward, tilted, planar contact area, a rearward, tilted, planar contact area, and a middle, horizontal, planar contact area.

14. A tracked mobility device according to claim 13, and further including:
 f) a multi-directional wheel having a first, raised position above the plane of said middle, horizontal, planar ground contact area, and a second, lowered position below the plane of said middle, horizontal, planar ground contact area; and
 g) an actuator effective to lower said multi-directional wheel to its lowered position, wherein the actuator lowers said wheel an amount sufficient to raise at least part of said first middle, horizontal, planar contact area and said second middle, horizontal, planar contact area from the ground when the device is resting on the ground without raising all of said first and second middle, horizontal, planar contact areas from the ground.

15. A tracked mobility device, comprising:
 a) a pair of track drives, each of said track drives defining a planar ground contact area, wherein said pair of planar ground contact areas are coplanar, wherein each of said ground contact areas including a forward ground contact area and a rearward ground contact area;
 b) a first castor wheel having a first, raised position above the plane of said ground contact areas, and a second, lowered position below the plane of said ground contact areas;
 c) a second castor wheel having a first, raised position above the plane of said ground contact areas, and a second, lowered position below the plane of said ground contact areas;
 d) a first actuator effective to lower said first castor wheel to its lowered position;
 e) a second actuator effective to lower said second castor wheel to its lowered position;
 wherein said first actuator and said second actuator cooperate to lower said first castor wheel and said second castor wheel an amount sufficient to raise one of said forward and rearward ground contact areas of each track drive from the floor when the device is resting on the floor without raising the other of said forward and rearward ground contact areas of each track drive from the floor;
 f) a body connected to each of said pair of track drives in a manner that allows each track drive to independently tilt upward or downward with respect to the body as the device moves forward or rearward on its tracks;
 g) a seat supported by said body; and
 h) a controller to control the speed and direction of rotation of each of the track drives.

16. The tracked mobility device of claim 15 wherein said first actuator and said second actuator cooperate to raise both of said rearward ground contact areas from the floor without raising either of said forward ground contact areas from the floor.

17. The tracked mobility device of claim 15 wherein said first actuator and said second actuator cooperate to raise both of said forward ground contact areas from the floor without raising either of said rearward ground contact areas from the floor.

18. The tracked mobility device of claim 15 wherein the controller comprises a joystick effective for independently controlling the speed and direction or rotation of each drive wheel.

* * * * *